Nov. 5, 1935. G. A. LYON 2,019,988
TIRE COVER
Original Filed Oct. 2, 1931 2 Sheets-Sheet 1
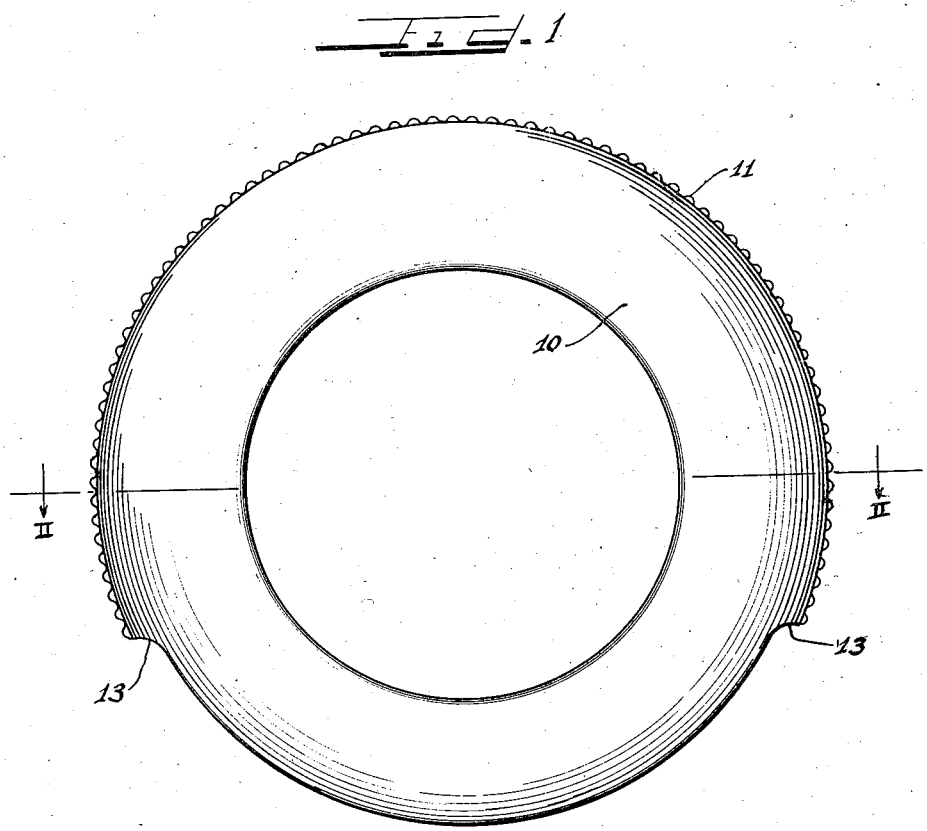
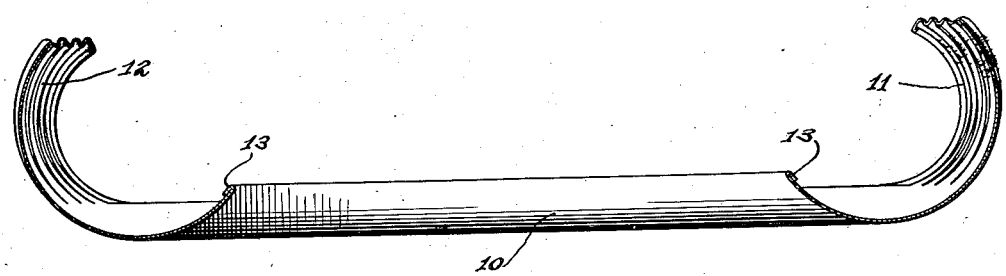
Inventor
George Albert Lyon.

Nov. 5, 1935.      G. A. LYON      2,019,988
TIRE COVER
Original Filed Oct. 2, 1931     2 Sheets-Sheet 2
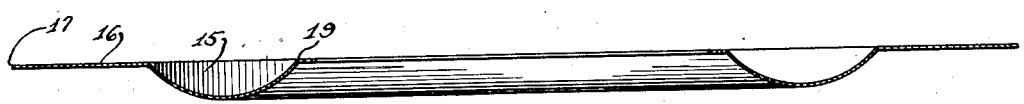
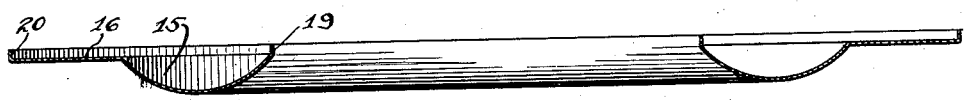
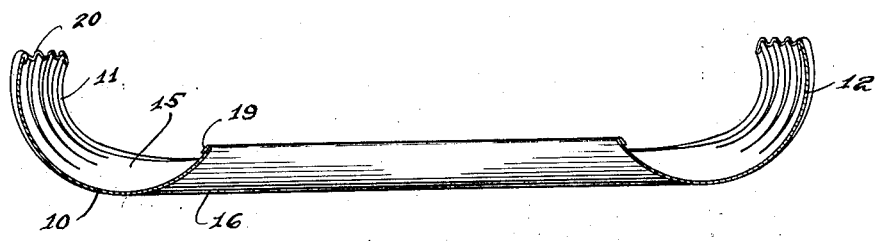
George Albert Lyon.

Patented Nov. 5, 1935

2,019,988

UNITED STATES PATENT OFFICE 2,019,988

TIRE COVER

George Albert Lyon, Allenhurst, N. J., assignor to Lyon Incorporated, Asbury Park, N. J., a corporation of Delaware Original application October 2, 1931, Serial No. 566,451, now Patent No. 1,965,531, dated July 3, 1934. Divided and this application April 18, 1932, Serial No. 605,850

6 Claims. (Cl. 150—54)

This invention relates to metallic tire covers and more particularly to a single piece unitary metallic tire cover.

The present subject matter has been divided from my copending patent application Serial No. 566,451, filed October 2, 1931, and patented July 3, 1934, No. 1,965,531.

It is the object of this invention to provide an improved, simplified single piece unitary metallic tire cover.

In accordance with the general features of this invention there is provided a single piece metallic tire cover including a side portion for disposition over an outer side wall of the spare tire and a flexible peripheral portion for disposition over the outer periphery or tread of the tire the former of which portions is adapted to be blanked from a single sheet of material and the latter of which portions is adapted to be thereafter formed from the blank so formed.

Another feature of the invention relates to the corrugating of the peripheral or rim portion of the cover so as to provide the same with flexibility whereby the cover may be readily flexed into proper tire protecting position on the tire.

Other objects and features of this invention will more fully appear from the following detailed description taken in connection with the accompanying drawings which illustrate a single embodiment thereof and in which Figure 1 is a side elevation of the tire cover embodying the features of this invention;

Figure 2 is horizontal cross sectional view taken on the line II—II of Figure 1 looking downwardly, and Figures 3, 4, 5, 6, and 7 are views of the cover in the different stages of its manufacture in accordance with the method also of my invention.

The cover of my invention is illustrated in Figures 1 and 2 and includes a side portion 10 for disposition over an outer side wall of a spare tire and a peripheral or rim portion 11 for disposition over the tread or outer periphery of the tire. These two portions are integral since the tire cover is made from a single piece of material. The material used may be of any suitable thin sheet material such for example as metallic sheet. Further it is to be noted that the peripheral portion 11 is provided with a plurality of transverse corrugations which corrugations are of greatest depth at their outermost extremities. These corrugations are indicated by the reference character 12.

The peripheral portion 11 does not extend clear around the plate portion 10 but is cut off at the point 13 indicated in Figure 1 so that the lower part of the cover includes only the downwardly projecting side portion 10. This construction enables the cover to be shoved downwardly into proper tire protecting position on a spare tire such for example as the spare tire mounted in a fenderwell of an automotive vehicle. Moreover the corrugations 12 in the peripheral portion 11 provide the same with flexibility so that the peripheral portion will expand upon being pushed over the tire and will thereafter contract to retain the cover in proper tire protecting position on the tire.

The peripheral portion 11 is of concavo-convex cross section and of such width that when the cover is on a spare tire the rear edge of this portion will extend inwardly from the outermost periphery of the tire to an extent sufficient to enable it to hold the cover on the tire against lateral displacement.

If it is desired additional clamping means may be used in the form of a suitable clamping arm or strap to secure the cover in place according to the requirements of the user.

In Figures 3 to 7 inclusive I have illustrated the various stages involved in the manufacture of my tire cover in accordance with the method of my invention.

In the first step of the method the square sheet of sheet material such for example as metallic sheet is subjected to a punch press operation whereby a ring-like depression 15 is formed in the sheet 16 as shown in Figure 3.

In the second step of the operation the corners of the square sheet are cut off so as to provide the same with a circular outer edge 17 as shown in Figure 4.

Also at the same time that the corners of the sheet are cut off a central ring-like disc may be punched from the plate 16 so as to provide a circular opening leaving a ring-like flange 19 adjacent the depression 15.

In the next step of the process illustrated in Figure 5 the ring-like flange 19 is bent upwardly as is also the outermost edge of the plate designated by the reference numeral 20.

Nextly the two upwardly bent flanges 19 and 20 are bent downwardly over the adjoining portions of the plate as shown in Figure 6 to form doubled back edges.

In the final operations involved in the manufacture of my cover the outer peripheral or marginal portion of the ring-like plate 16 is bent upwardly and inwardly so as to define the peripheral or tread covering portion 11 of the cover. This bending operation may be accomplished either by a punch press operation, by a spinning operation or the like. After this outer peripheral portion of the plate is bent into the form shown in Figure 7 so as to define the peripheral portion 11 of the cover the same may be suitably corrugated to provide the corrugations previously described in connection with Figures 1 and 2 and designated by the reference character 12. Also preferably before the portion 11 of the cover is formed a part of this outer portion of the ring-like cover may be cut away at the points indicated at 13 in Figure 1 so that the lower part of the cover does not include a peripheral portion.

It will of course be appreciated that when the cover is completely fabricated the depression 15 previously described constitutes the outer side wall portion 10 of the cover and the upwardly and inwardly bent peripheral part of the ring-like plate constitutes the corrugated peripheral portion 11 of the cover.

Now it is of course understood that although I have described in detail the preferred embodiment of my invention the invention is not to be thus limited but only insofar as defined by the scope and spirit of the appended claims.

I claim as my invention:

1. As an article of manufacture, a single piece unitary resiliently yieldable tire cover including a ring-like side portion for disposition over a side of the tire and a discontinuous transversely corrugated rim or peripheral portion for disposition over the tread of the tire, the corrugations of said peripheral portion being of such character as to provide that portion with flexibility so that it will yieldably flex as the tire cover is shoved downwardly into tire protecting position on the tire.

2. As an article of manufacture, a single piece unitary resiliently yieldable tire cover including a circular side portion for disposition over a side wall of the tire and a discontinuous peripheral portion for disposition over the outer periphery or tread of the tire, said portion having transverse deformations providing the cover with flexibility whereby it may be shoved downwardly into tire protecting position on a spare tire such as a spare tire mounted in the fenderwell of an automobile.

3. As an article of manufacture, a single piece unitary resiliently yieldable tire cover including a circular side portion for disposition over a side wall of the tire and a discontinuous peripheral portion for disposition over the outer periphery or tread of the tire, said portion having transverse deformations providing the cover with flexibility whereby it may be shoved downwardly into tire protecting position on a spare tire such as a spare tire mounted in the fenderwell of an automobile and being of such circumferential length as to extend about at least substantially all of the tread of the tire exposed above the fenderwell.

4. As an article of manufacture, a single piece unitary resiliently yieldable tire cover including a circular side portion for disposition over a side wall of the tire and a discontinuous peripheral portion for disposition over the outer periphery or tread of the tire, said portion having transverse deformations providing the cover with flexibility whereby it may be shoved downwardly into tire protecting position on a spare tire such as a spare tire mounted in the fenderwell of an automobile and being of such width as to have its rear edge project inwardly from the outermost periphery of the spare tire on its rear side to an extent sufficient to prevent lateral displacement of the tire on the cover.

5. As an article of manufacture, a single piece unitary resiliently yieldable tire cover including a circular side portion for disposition over a side wall of the tire and a discontinuous peripheral portion for disposition over the outer periphery or tread of the tire, said portion having transverse deformations providing the cover with flexibility whereby it may be shoved downwardly into tire protecting position on a spare tire such as a spare tire mounted in the fenderwell of an automobile and being of such circumferential length as to extend about at least substantially all of the tread of the tire exposed above the fenderwell as well as being of such width as to have its rear edge project inwardly from the outermost periphery of the spare tire on its rear side to an extent sufficient to prevent lateral displacement of the tire on the cover.

6. As an article of manufacture, a single piece unitary resiliently yieldable tire cover made of sheet material such as metal sheet, including a ring-like side portion for disposition over a side of the tire, and a discontinuous transversely deformed resilient rim or peripheral portion for disposition over the tread of the tire, the transverse resilience of said peripheral portion being provided by the deformation in said portion and being of such character as to provide that portion with flexibility so that it will yieldably flex as the tire cover is shoved downwardly into tire protecting position on the tire.

GEORGE ALBERT LYON.